US012647037B2

(12) United States Patent
Lu

(10) Patent No.: US 12,647,037 B2
(45) Date of Patent: Jun. 2, 2026

(54) CASCADE CIRCUIT AND CONTROL METHOD THEREFOR

(71) Applicant: MORNSUN GUANGZHOU SCIENCE & TECHNOLOGY CO., LTD., Guangdong (CN)

(72) Inventor: Pengfei Lu, Guangdong (CN)

(73) Assignee: MORNSUN GUANGZHOU SCIENCE & TECHNOLOGY CO., LTD., Guangdong (CN)

( * ) Notice: Subject to any disclaimer, the term of this patent is extended or adjusted under 35 U.S.C. 154(b) by 143 days.

(21) Appl. No.: 18/694,417

(22) PCT Filed: Sep. 28, 2022

(86) PCT No.: PCT/CN2022/122040
§ 371 (c)(1),
(2) Date: Mar. 22, 2024

(87) PCT Pub. No.: WO2023/098267
PCT Pub. Date: Jun. 8, 2023

(65) Prior Publication Data
US 2024/0388212 A1     Nov. 21, 2024

(30) Foreign Application Priority Data
Nov. 30, 2021    (CN) .......................... 202111442324.7

(51) Int. Cl.
H02M 3/335        (2006.01)
H02M 1/44         (2007.01)

(52) U.S. Cl.
CPC ......... H02M 3/33576 (2013.01); H02M 1/44 (2013.01)

(58) Field of Classification Search
CPC ........... H02M 1/32; H02M 1/081–084; H02M 1/0006; H02M 3/156; H02M 3/158;
(Continued)

(56) References Cited

U.S. PATENT DOCUMENTS

2008/0123374 A1*   5/2008   Vinciarelli .............. H02M 7/10
363/65

FOREIGN PATENT DOCUMENTS

CN          202818089          3/2013
CN          103354420          10/2013
(Continued)

OTHER PUBLICATIONS

Abraham I. Pressman, "Switching Power Supply Design, 2nd Edition", Jan. 16, 1998, pp. 1-677, McGraw-Hill Education.
(Continued)

*Primary Examiner* — Bryan R Perez
(74) *Attorney, Agent, or Firm* — JCIP GLOBAL INC.

(57)     ABSTRACT
A cascade circuit including a preceding-stage buck-boost circuit and a post-stage isolation switch power supply circuit is provided. One end of the switch transistor Q1 serves as a positive input of the buck-boost circuit, and the other end is connected to one end of the switch transistor Q2 and one end of the inductor L. The other end of the inductor L, one end of the switch transistor Q4, and one end of the capacitor C1 are connected to serve as a positive output of the buck-boost circuit. The other end of the capacitor C1 is connected to one end of the switch transistor Q3. The other end of the switch transistor Q2, the other end of the switch transistor Q4, and the other end of the switch transistor Q3 are connected to serve as an input power supply ground of the buck-boost circuit.

7 Claims, 10 Drawing Sheets

(58) Field of Classification Search
CPC .. H02M 3/1588; H02M 3/155; H02M 3/1582;
H02M 3/157; H02M 3/1563; H02M
3/1584; H03K 17/161; H03K 17/302;
H03K 17/56; H03K 17/567; H03K 17/60;
H03K 17/687; H03K 17/6871; H03K
17/16; H03K 17/30; H03K 17/601; H03K
17/64; H03K 17/691; H03K 17/731;
H03K 17/10; H03K 17/102; H03K
17/107; H03K 17/12; H03K 17/122;
H03K 17/127
See application file for complete search history.

(56)                References Cited

FOREIGN PATENT DOCUMENTS

| CN | 105141134 | 12/2015 |
| CN | 107800300 | 3/2018 |
| CN | 111884514 | 11/2020 |
| CN | 114221549 | 3/2022 |
| DE | 2941009 | 4/1981 |

OTHER PUBLICATIONS

"International Search Report (Form PCT/ISA/210) of PCT/CN2022/122040", mailed on Dec. 13, 2022, with English translation thereof, pp. 1-5.
"Written Opinion of the International Searching Authority (Form PCT/ISA/237) of PCT/CN2022/122040", mailed on Dec. 13, 2022, pp. 1-4.

\* cited by examiner

CASCADE CIRCUIT AND CONTROL METHOD THEREFOR

CROSS-REFERENCE TO RELATED APPLICATION

This application is a 371 of international application of PCT application serial no. PCT/CN2022/122040, filed on Sep. 28, 2022, which claims the priority benefit of China application no. 202111442324.7, filed on Nov. 30, 2021. The entirety of each of the above-mentioned patent applications is hereby incorporated by reference herein and made a part of this specification.

TECHNICAL FIELD

The disclosure relates to the field of switch power supply, and particularly relates to a cascade circuit and a control method therefor.

DESCRIPTION OF RELATED ART

Please refer to FIG. 1, which is a well-known Buck+ push-pull two-stage cascade circuit. The bus capacitor C1 decouples the preceding-stage Buck and the post-stage push-pull, and working processes thereof basically do not affect each other. The voltage of the output bus of the preceding-stage Buck supplies power to the post-stage push-pull in the form of a voltage source, forming a voltage feed working manner, which is generally used in wide input voltage scenarios. Compared with single-stage topologies such as flyback and forward, the post-stage push-pull circuit in FIG. 1 is completely decoupled from changes in the input voltage, the type selection of the primary and secondary switch transistor and the transformer design become simple, which improves the power supply efficiency, reduces the cost, and reduces the product volume. However, when the minimum voltage value of the input voltage is small, the circuit efficiency decreases significantly, which is because the preceding-stage Buck circuit in FIG. 1 determines that a Vbus voltage needs to be less than a minimum input voltage Vin. For example, the input voltage Vin is in a range of 9 to 36V, the Vbus voltage is set to 6V, and the output is 400 W. According to the conversion efficiency of 90%, the maximum current flowing through switch transistors Q1, Q2, Q5, Q6, and an inductor L in FIG. 1 are all greater than 74 A. Therefore, the conduction loss is large.

In order to reduce the conduction loss, the Vbus voltage needs to be increased. Please refer to FIG. 2, the preceding-stage Buck circuit in FIG. 1 is replaced with a Buck-Boost circuit, and the Vbus voltage is increased to 24V. Then, the maximum current flowing through the switch transistors Q5 and Q6 in FIG. 2 is merely greater than 18.5 A. The maximum current flowing through the switch transistors Q1, Q2, and the inductor L is reduced, the total conduction loss of the circuit is reduced, and the efficiency is improved. However, compared to FIG. 1, the added switch transistors Q3 and Q4 are connected in the power loop, the switch transistors Q3 and Q4 generate conduction loss and switch loss, and also increase the cost and volume of the switch power supply.

Please refer to FIGS. 3 and 4, which are FIGS. 3 and 4 in the German patent application filed in 1979 with the publication number DE 2941009A1. The patent discloses a Buck+ push-pull current feed circuit and a control method. There is no bus capacitor between the preceding-stage Buck and the post-stage push-pull, and working processes affect each other. The output current of the preceding-stage Buck supplies power to the post-stage push-pull in the form of a current source, forming a current feed working manner, and the wide voltage input isolation type buck-boost function is realized. In addition, in the current feed chapter of the book "Switching Power Supply Design" published in 1998, the circuit and control of Buck+ push-pull are mentioned, which is similar to FIGS. 3 and 4. Please refer to FIG. 5. Compared to FIG. 2, although the switch transistor Q3, the switch transistor Q4, and the capacitor C1 are omitted, when the current in the inductor L is inconsistent with the leakage inductance current of a transformer T, the peak voltage generated by Vbus superimposes the energy of the transformer leakage inductance, which causes the peak voltage stress of the switch transistors Q5 and Q6 to be large, and the switch transistors Q5 and Q6 are turned on at the same time, the current to excite the inductor L has to pass through the primary winding of the transformer T, so that the conduction loss of the transformer primary side becomes large.

SUMMARY

In view of the problems existing in the current two-stage cascade circuit, the technical problem to be solved by the disclosure is to propose a cascade circuit and a control method therefor to improve the working efficiency of the power supply and reduce the cost and volume of the power supply.

As the first aspect of the disclosure, the technical solution of the proposed cascade circuit is as follows.

A cascade circuit includes a buck-boost circuit and an isolation switch power supply circuit.

The buck-boost circuit includes a switch transistor Q1, a switch transistor Q2, a switch transistor Q4, an inductor L, an active clamping switch transistor Q3, and an active clamping capacitor C1.

The isolation switch power supply circuit includes a primary switch circuit, a transformer, and a secondary rectifier circuit.

One end of the switch transistor Q1 serves as a positive input of the buck-boost circuit and a positive input of the cascade circuit at the same time. The other end of the switch transistor Q1 is connected to one end of the switch transistor Q2 and one end of the inductor L. The other end of the inductor L, one end of the switch transistor Q4, and one end of the active clamping capacitor C1 are connected together to serve as a positive output of the buck-boost circuit. The other end of the active clamping capacitor C1 is connected to one end of the active clamping switch transistor Q3. The other end of the switch transistor Q2, the other end of the switch transistor Q4, and the other end of the active clamping switch transistor Q3 are connected together to serve as an input power supply ground of the buck-boost circuit and an input ground of the cascade circuit.

A positive input of the isolation switch power supply circuit is connected to the positive output of the buck-boost circuit. A negative input of the isolation switch power supply circuit is connected to the input power supply ground of the buck-boost circuit. A positive output of the isolation switch power supply circuit serves as a positive output of the cascade circuit. A negative output of the isolation switch power supply circuit serves as a negative output of the cascade circuit.

Preferably, the primary switch circuit includes two switch transistors, and the two switch transistors and the transformer form a push-pull circuit. The secondary rectifier circuit includes two switch transistors, and the two switch transistors and the transformer form a full-wave rectifier circuit.

Preferably, the primary switch circuit includes four switch transistors, and the four switch transistors and the transformer form a full-bridge circuit. The secondary rectifier circuit includes two switch transistors, and the two switch transistors and the transformer form a full-wave rectifier circuit.

Preferably, the primary switch circuit includes four switch transistors, and the four switch transistors and the transformer form a full-bridge circuit. The secondary rectifier circuit includes four switch transistors, and the four switch transistors and the transformer form a full-bridge rectifier circuit.

Preferably, the primary switch circuit includes two switch transistors, and the two switch transistors and the transformer form a push-pull circuit. The secondary rectifier circuit includes four switch transistors, and the four switch transistors and the transformer form a full-bridge rectifier circuit.

Preferably, the switch transistor Q1, the switch transistor Q2, the switch transistor Q4, and the active clamping switch transistor Q3 are MOS transistors, triodes, or insulated-gate bipolar transistors (IGBTs).

As the second aspect of the disclosure, the technical solution of the proposed control method for the cascade circuit is as follows.

A control method for the cascade circuit described in any of the above is detailed as follows.

When a voltage of the positive input of the cascade circuit is less than a voltage of the positive output of the buck-boost circuit, the cascade circuit works in a boost mode, in which the boost mode includes at least an excitation phase and a demagnetization phase. Regardless of whether it is the excitation phase or the demagnetization phase, the switch transistor Q1 remains on, and the switch transistor Q2 remains off. During the excitation phase, the switch transistor Q4 and the primary switch circuit are both on, and the active clamping switch transistor Q3 is off. During the demagnetization phase, the switch transistor Q4 is off, the active clamping switch transistor Q3 is turned on or turned on for part of time, and part of the switch transistors of the primary switch circuit is on, thereby the transformer transfers energy from a primary side to a secondary side.

A control method for the cascade circuit described in any of the above is detailed as follows.

When a voltage of the positive input of the cascade circuit is greater than a voltage of the positive output of the buck-boost circuit, the cascade circuit works in a buck mode, in which the buck mode includes at least an excitation phase and a demagnetization phase. Regardless of whether it is the excitation phase or the demagnetization phase, the switch transistor Q4 remains off, and the active clamping switch transistor Q3 is turned on or turned on for part of time. During the excitation phase, the switch transistor Q2 is off, and the switch transistor Q1 and part of the switch transistors of the primary switch circuit are on, thereby the transformer transfers energy from a primary side to a secondary side. During the demagnetization phase, the switch transistor Q1 is off, and the switch transistor Q2 and part of the switch transistors of the primary switch circuit are on, thereby the transformer transfers energy from the primary side to the secondary side.

By means of current feed manner according to the disclosure, the device model selection, EMI, and efficiency of the switch transistor can be greatly optimized by using an active clamping circuit comprising the switch transistor Q4, the switch transistor Q3, and the capacitor C1 in combination with the buck-boost control method, thereby the cost and volume are reduced. The detailed analysis of the beneficial effects is as follows.

(1) Compared with the related art in FIG. 1, through increasing the voltage of the bus Vbus, the disclosure reduces the conduction current and conduction loss of the primary switch circuit of the preceding-stage buck-boost circuit and the post-stage isolation switch power supply circuit and the transformer primary side thereby the device model selection of the switch transistor is optimized, and the working efficiency of the power supply is improved.

(2) Compared with the related art in FIG. 2, the disclosure changes the switch transistor Q3 in FIG. 2 from being connected in series in the power loop to the active clamping switch transistor Q3. The conduction loss is significantly reduced, and the active clamping switch transistor Q3 does not have reverse recovery phenomenon, so that the EMI of the circuit is improved.

(3) In the excitation phase of the boost mode, in FIG. 2, merely the switch transistor Q4 is on. In contrast, in the disclosure, both the switch transistor Q4 and the primary switch circuit are on. By using the cascade circuit of the disclosure and the control method according to the disclosure, the conduction impedance can be reduced, thereby the conduction loss is reduced, and the working efficiency of the circuit is improved. Also, the reduction of the conduction impedance is quite significant in the excitation phase of the boost mode.

(4) In the related art, in the excitation phase of the boost mode in FIG. 5, the switch transistor Q5 and the switch transistor Q6 are on, and the excitation current passes through the switch transistor Q5, the switch transistor Q6, and the primary winding of the transformer. When the switch transistor Q5 or the switch transistor Q6 is off to end the excitation phase and start the demagnetization phase of the boost mode, since the current in the inductor L is inconsistent with the leakage inductance current of the transformer T, the generated Vbus peak voltage superimposes the energy of the transformer leakage inductance, which causes the peak voltage stress of the switch transistor Q5 and the switch transistor Q6 to be large. Therefore, for the switch transistor Q5 and the switch transistor Q6, a high withstand voltage switch transistor should be selected, resulting in large conduction impedance, and the overall conduction loss on the transformer primary side and the switch transistor Q5 and the switch transistor Q6 is large. By using the cascade circuit of the disclosure, during the excitation phase of the boost mode, both the switch transistor Q4 and the primary switch circuit are controlled to be on. Since the voltage stress of the switch transistor Q4 is low, the conduction impedance thereof is small, and smaller than the impedance of the primary switch circuit when being conductive. Therefore, the excitation current mainly passes through the switch transistor Q4, which greatly reduces the conduction loss of the primary switch circuit and the transformer primary side. At the same time, the clamping network comprising the active clamping capacitor C1 and the active clamping switch transistor Q3 is used to greatly reduce the voltage peak stress of the switch transistor in the primary switch circuit, thereby the model selection and EMI of the switch transistor are optimized, and the working efficiency of the power supply is improved.

DESCRIPTION OF THE EMBODIMENTS

Figure 1:
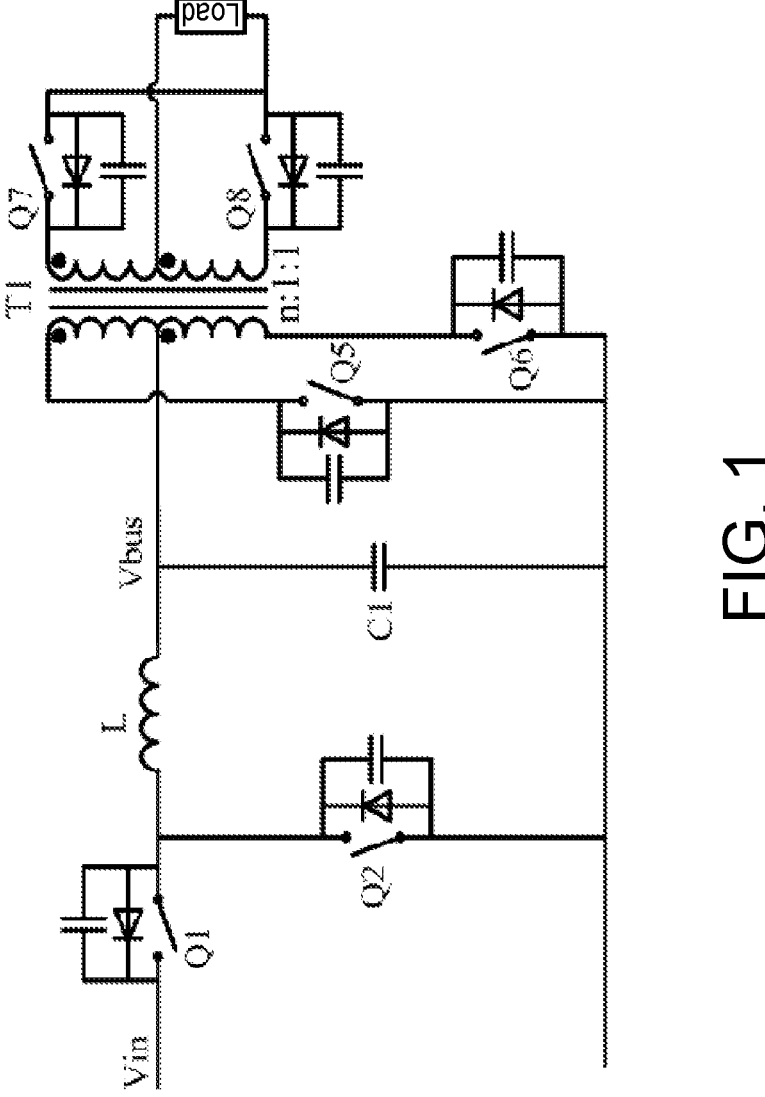
FIG. 1 is a schematic diagram showing the principle of a conventional Buck+ push-pull two-stage cascade circuit.
Figure 2:
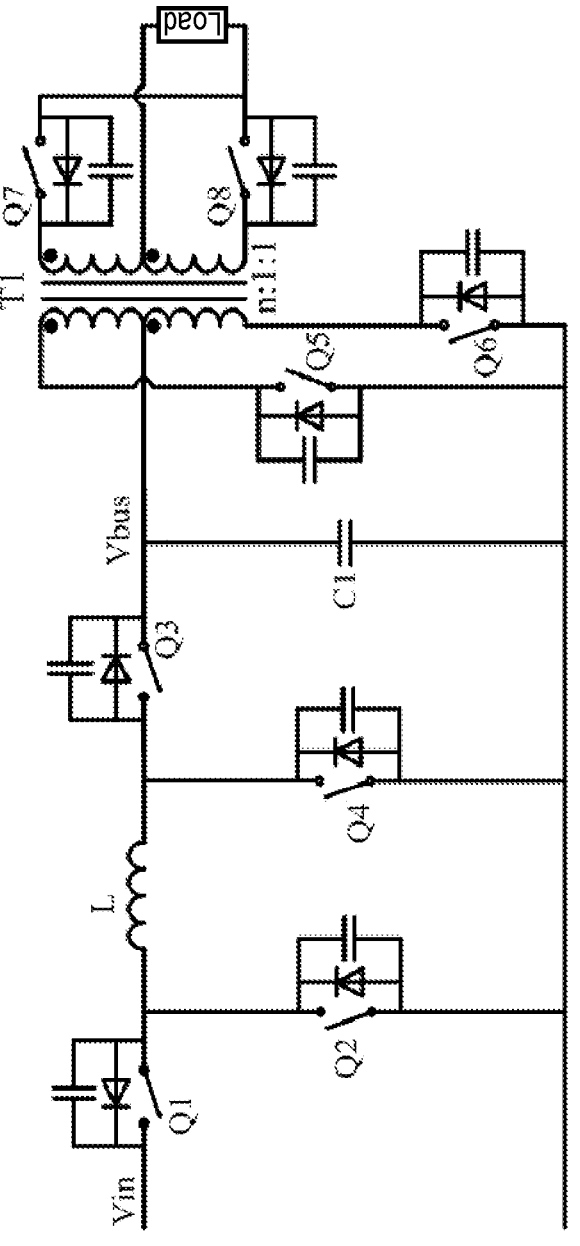
FIG. 2 is a schematic diagram showing the principle of a conventional Buck-Boost+ push-pull two-stage cascade circuit.
Figure 3:
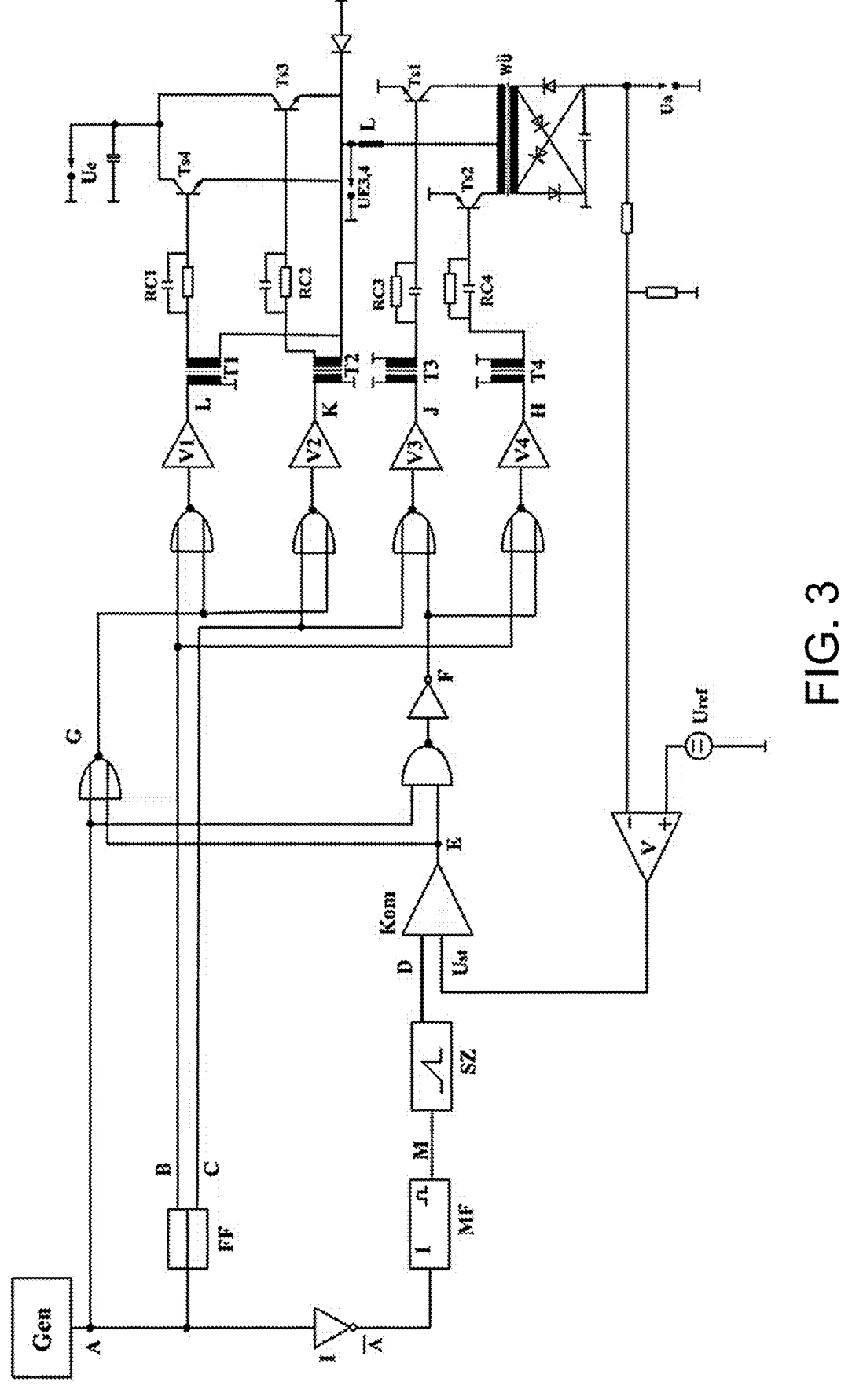
FIG. 3 is a schematic diagram showing the principle of a conventional Buck+ push-pull current feed circuit.
Figure 4:
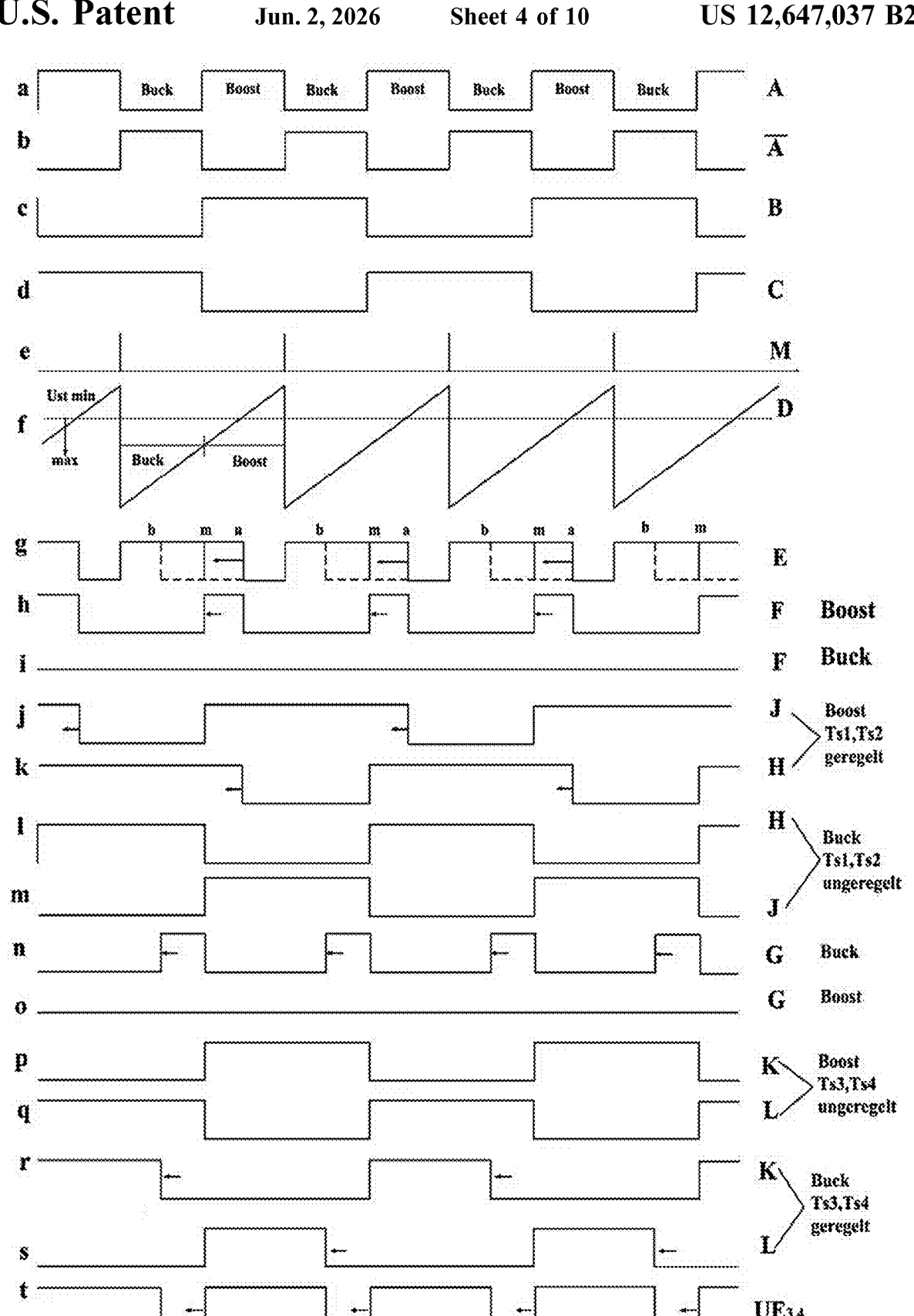
FIG. 4 is a control timing diagram of a conventional Buck+ push-pull current feed circuit.
Figure 5:
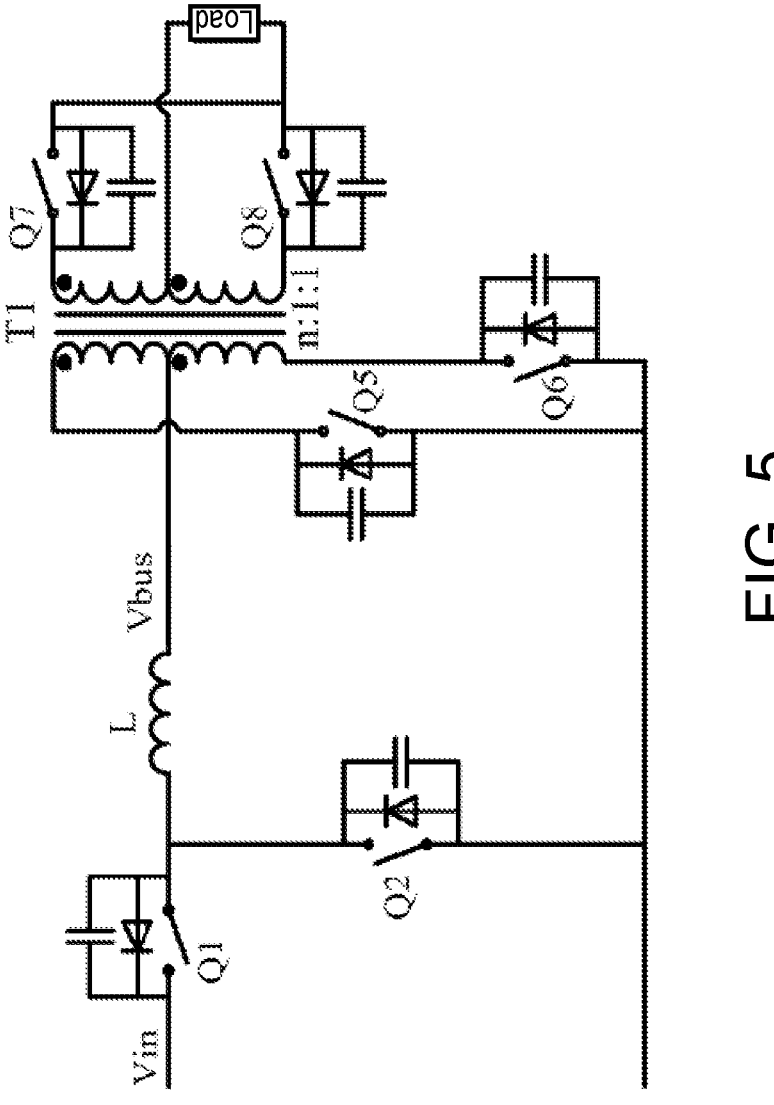
FIG. 5 is a schematic diagram of the principle of the Buck+ push-pull current feed circuit according to another source of related art.
Figure 6:
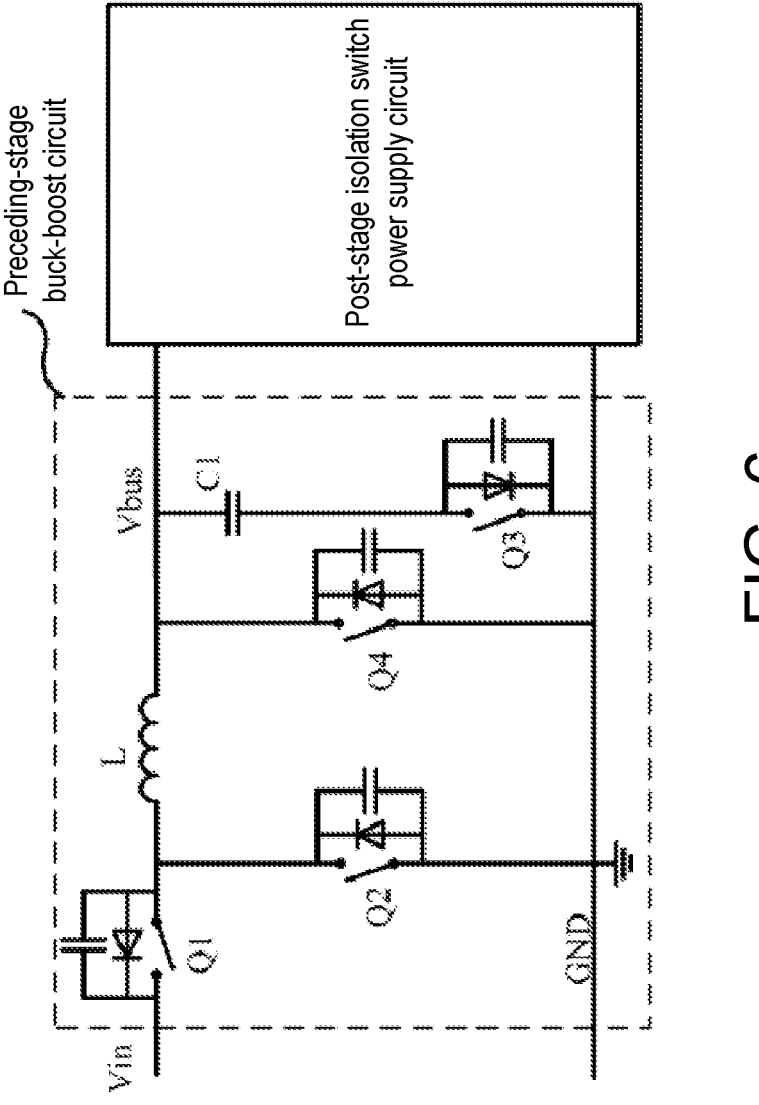
FIG. 6 is a schematic diagram showing the principle of a cascade circuit according to the disclosure.

FIG. 6 is a schematic diagram showing the principle of a cascade circuit according to the disclosure. As shown in FIG. 6, a preceding-stage buck-boost circuit and a post-stage isolation switch power supply circuit are included.

The preceding-stage buck-boost circuit includes input power supply positive, input power supply ground, a switch transistor Q1, a switch transistor Q2, a switch transistor Q4, an inductor L, an active clamping switch transistor Q3, and an active clamping capacitor C1.

The post-stage isolation switch power supply circuit includes a primary switch circuit, a transformer, and a secondary rectifier circuit.

One end of the switch transistor Q1 is connected to an input power supply Vin, which is the positive input of the buck-boost circuit and is also the positive input of the cascade circuit. Another end of the switch transistor Q1 and one end of the switch transistor Q2 are connected to one end of the inductor L. Another end of the inductor L, one end of the switch transistor Q4, one end of the active clamping capacitor C1, and one end of the post-stage isolation switch power supply circuit are connected to a bus Vbus, which is the positive output of the buck-boost circuit and is also the positive input of the isolation switch power supply circuit. Another end of the active clamping capacitor C1 is connected to one end of the active clamping switch transistor Q3. Another end of the switch transistor Q2, another end of the switch transistor Q4, another end of the post-stage isolation switch power supply circuit, and another end of the active clamping switch transistor Q3 are connected to an input power supply GND, which is the input power supply ground GND of the buck-boost circuit and is also the input ground of the cascade circuit and the negative input of the isolation switch power supply circuit. The positive output of the isolation switch power supply circuit is used as the positive output of the cascade circuit. The negative output of the isolation switch power supply circuit is used as the negative output of the cascade circuit.

A primary switch circuit may be a push-pull circuit or a full-bridge circuit.

A secondary rectifier circuit may be a full-wave rectifier circuit or a full-bridge rectifier circuit.

It should be noted that the switch transistor adopts a metal oxide semiconductor transistor (MOSFET). However, other types of electronically controlled switch devices, such as bipolar junction transistors (BJT) and insulated-gate bipolar transistors (IGBT), may also be used as the switch transistor in this embodiment.

The cascade circuit of the disclosure includes at least a boost mode and a buck mode. When the voltage of the input power supply Vin is less than the voltage of the bus Vbus, the cascade circuit operates in the boost mode; when the voltage of the input power supply Vin is greater than the voltage of the bus Vbus, the cascade circuit operates in the buck mode.

The boost mode includes at least an excitation phase and a demagnetization phase, in which regardless of whether it is the excitation phase or the demagnetization phase, the switch transistor Q1 remains on, and the switch transistor Q2 remains off; during the excitation phase, the switch transistor Q4 and the primary switch circuit are both on, and the active clamping switch transistor Q3 is off; during the demagnetization phase, the switch transistor Q4 is off, the active clamping switch transistor Q3 is turned on or turned on for part of the time, and part of the switch transistors of the primary switch circuit is on, thereby the energy is transferred from the primary side to the secondary side through the transformer.

The buck mode includes at least an excitation phase and a demagnetization phase, in which regardless of whether it is the excitation phase or the demagnetization phase, the switch transistor Q4 remains off, and the active clamping switch transistor Q3 is turned on or turned on for part of the time; during the excitation phase, the switch transistor Q2 is off, and the switch transistor Q1 and part of the switch transistors of the primary switch circuit are on, thereby the energy is transferred from the primary side to the secondary side through the transformer; during the demagnetization phase, the switch transistor Q1 is off, and the switch transistor Q2 and part of the switch transistors of the primary switch circuit are on, thereby the energy is transferred from the primary side to the secondary side through the transformer.

The cascade circuit and the control method therefor according to the disclosure maintain the voltage of the bus Vbus to be less than a maximum voltage of the input power supply Vin and greater than a minimum voltage of the input power supply Vin, thereby the current stress of the switch transistor in the preceding-stage buck-boost circuit and the primary switch circuit is reduced. The active clamping circuit and the control method therefor comprising the active clamping switch transistor Q3 and the active clamping capacitor C1 reduce the peak voltage stress of the switch transistor in the primary switch circuit. Especially in the boost mode, through shunting the current of the primary switch circuit by the switch transistor Q4, the conduction loss of the switch transistor and transformer primary side in the primary switch circuit is reduced. Due to the reduction of the current of the transformer primary side, the leakage inductance energy is reduced, and the peak voltage stress of the switch transistor in the primary switch circuit is indirectly reduced, thereby the device model selection and EMI of the switch transistor are optimized, and the working efficiency of the power supply is improved.

The First Embodiment

Figure 7:
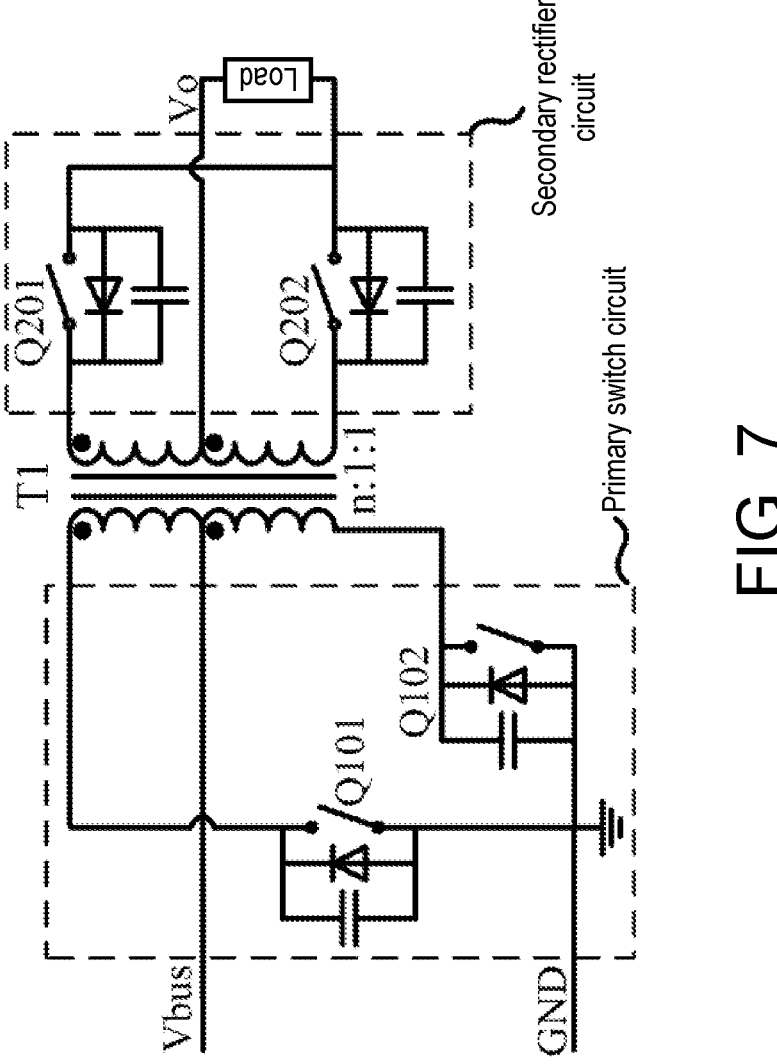
FIG. 7 is a schematic diagram showing the principle of the post-stage isolation switch power supply circuit according to a first embodiment of the disclosure.

Please refer to FIG. 7. FIG. 7 is a schematic diagram showing the principle of the post-stage isolation switch power supply circuit according to the first embodiment of the disclosure, which includes a primary switch circuit, a transformer T1, and a secondary rectifier circuit. The primary switch circuit includes two switch transistors, and the two switch transistors and the transformer form a push-pull circuit; the secondary rectifier circuit includes two switch transistors, and the two switch transistors and the transformer form a full-wave rectifier circuit. The details are as follows.

The primary switch circuit includes a switch transistor Q101 and a switch transistor Q102.

The transformer T1 includes a primary winding with a center tap and a secondary winding with a center tap.

The secondary rectifier circuit includes a switch transistor Q201 and a switch transistor Q202.

One end of the switch transistor Q101 is connected to the dotted terminal of the primary winding of the transformer T1, and one end of the switch transistor Q102 is connected to the non-dotted terminal of the primary winding of the transformer T1. Another end of the switch transistor Q101 and another end of the switch transistor Q102 are connected to the input power supply ground GND. The center tap of the primary winding of the transformer T1 is connected to the bus Vbus. One end of the switch transistor Q201 is connected to the same end of the secondary winding of the transformer T1, and one end of the switch transistor Q202 is connected to the opposite end of the secondary winding of the transformer T1. Another end of the switch transistor Q201 and another end of the switch transistor Q202 are connected to the negative output of the cascade circuit. The center tap of the secondary winding of the transformer T1 is connected to a positive output Vo of the cascade circuit. The space between the positive output of the cascade circuit and the negative output of the cascade circuit is used to provide energy to the connected load.

The boost mode includes at least the excitation phase and the demagnetization phase. During the excitation phase, the switch transistor Q101 and the switch transistor Q102 are both on, and the switch transistor Q201 and the switch transistor Q202 are both off. The demagnetization phase is divided into two types, which work alternately, in which a first type is: the switch transistor Q101 and the switch transistor Q201 are both off, the switch transistor Q102 and the switch transistor Q202 are both on, and the transformer T1 transfers energy from the primary side to the secondary side; a second type is: the switch transistor Q101 and the switch transistor Q201 are both on, the switch transistor Q102 and the switch transistor Q202 are both off, and the transformer T1 transfers energy from the primary side to the secondary side.

The buck mode includes at least two alternating working states, in which a first type is: the switch transistor Q101 and the switch transistor Q201 are both off, and the switch transistor Q102 and the switch transistor Q202 are both on; a second type is: the switch transistor Q101 and the switch transistor Q201 are both on, and the switch transistor Q102 and the switch transistor Q202 are both off. In both working states, the transformer T1 can transfer energy from the primary side to the secondary side.

The Second Embodiment

Figure 8:
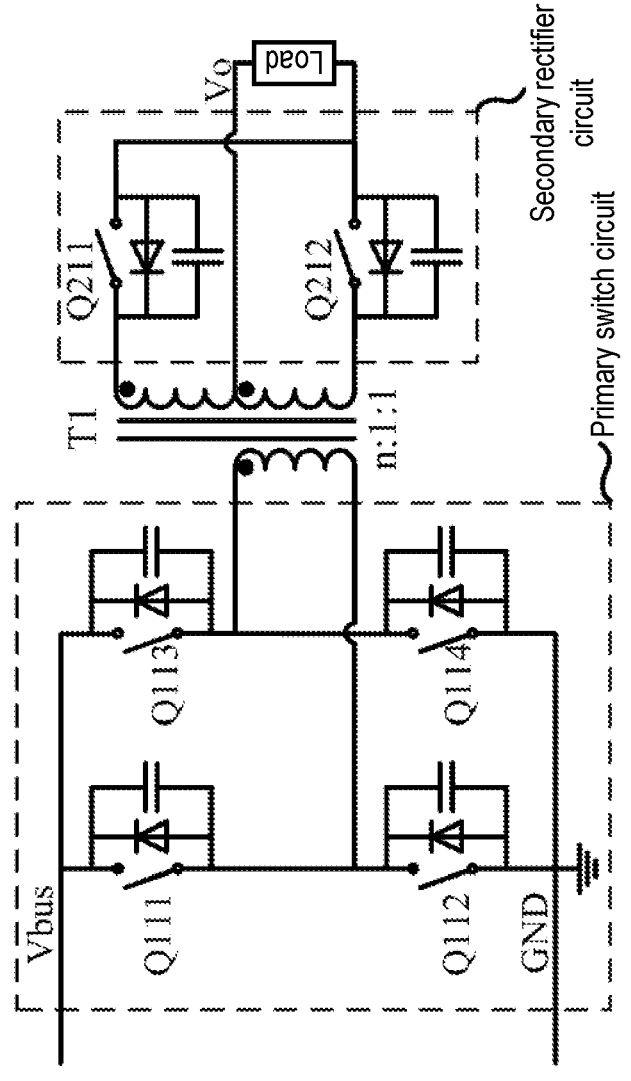
FIG. 8 is a schematic diagram showing the principle of the post-stage isolation switch power supply circuit according to a second embodiment of the disclosure.

Please refer to FIG. 8. FIG. 8 is a schematic diagram showing the principle of the post-stage isolation switch power supply circuit according to the second embodiment of the disclosure, which includes a primary switch circuit, a transformer T1, and a secondary rectifier circuit. The primary switch circuit includes four switch transistors, and the four switch transistors and the transformer form a full-bridge circuit; the secondary rectifier circuit includes two switch transistors, and the two switch transistors and the transformer form a full-wave rectifier circuit. The details are as follows.

The primary switch circuit includes a switch transistor Q111, a switch transistor Q112, a switch transistor Q113, and a switch transistor Q114.

The transformer T1 includes a primary winding and a secondary winding with a center tap.

The secondary rectifier circuit includes a switch transistor Q211 and a switch transistor Q212.

One end of the switch transistor Q111 and one end of the switch transistor Q113 are connected to the bus Vbus. Another end of the switch transistor Q111 and one end of the switch transistor Q112 are connected to the opposite end of the primary winding of the transformer T1, and another end of the switch transistor Q113 and one end of the switch transistor Q114 are connected to the same end of the primary winding of the transformer T1. Another end of the switch transistor Q112 and another end of the switch transistor Q114 are connected to the input power supply ground GND. One end of the switch transistor Q211 is connected to the same end of the secondary winding of the transformer T1, and one end of the switch transistor Q212 is connected to the opposite end of the secondary winding of the transformer T1. Another end of the switch transistor Q211 and another end of the switch transistor Q212 are connected to the negative output of the cascade circuit. The center tap of the secondary winding of the transformer T1 is connected to the positive output Vo of the cascade circuit. The space between the positive output of the cascade circuit and the negative output of the cascade circuit is used to provide energy to the connected load.

The boost mode includes at least the excitation phase and the demagnetization phase. During the excitation phase, the switch transistor Q111, the switch transistor Q112, the switch transistor Q113, and the switch transistor Q114 are all on, and the switch transistor Q211 and the switch transistor Q212 are all off. The demagnetization phase is divided into two types, which work alternately, in which a first type is: the switch transistor Q111, the switch transistor Q114, and the switch transistor Q211 are all off, the switch transistor Q112, the switch transistor Q113, and the switch transistor Q212 are all on, and the transformer T1 transfers energy from the primary side to the secondary side; a second type is: the switch transistor Q112, the switch transistor Q113, and the switch transistor Q212 are all off, the switch transistor Q111, the switch transistor Q114, and the switch transistor Q211 are all on, and the transformer T1 transfers energy from the primary side to the secondary side.

The buck mode includes at least two alternate working states, in which a first type is: the switch transistor Q111, the switch transistor Q114, and the switch transistor Q211 are all off, and the switch transistor Q112, the switch transistor Q113, and the switch transistor Q212 are all on; a second type is: the switch transistor Q112, the switch transistor Q113, and the switch transistor Q212 are all off, and the switch transistor Q111, the switch transistor Q114, and the switch transistor Q211 are all on. In both working states, the transformer T1 can transfer energy from the primary side to the secondary side.

The Third Embodiment

Figure 9:
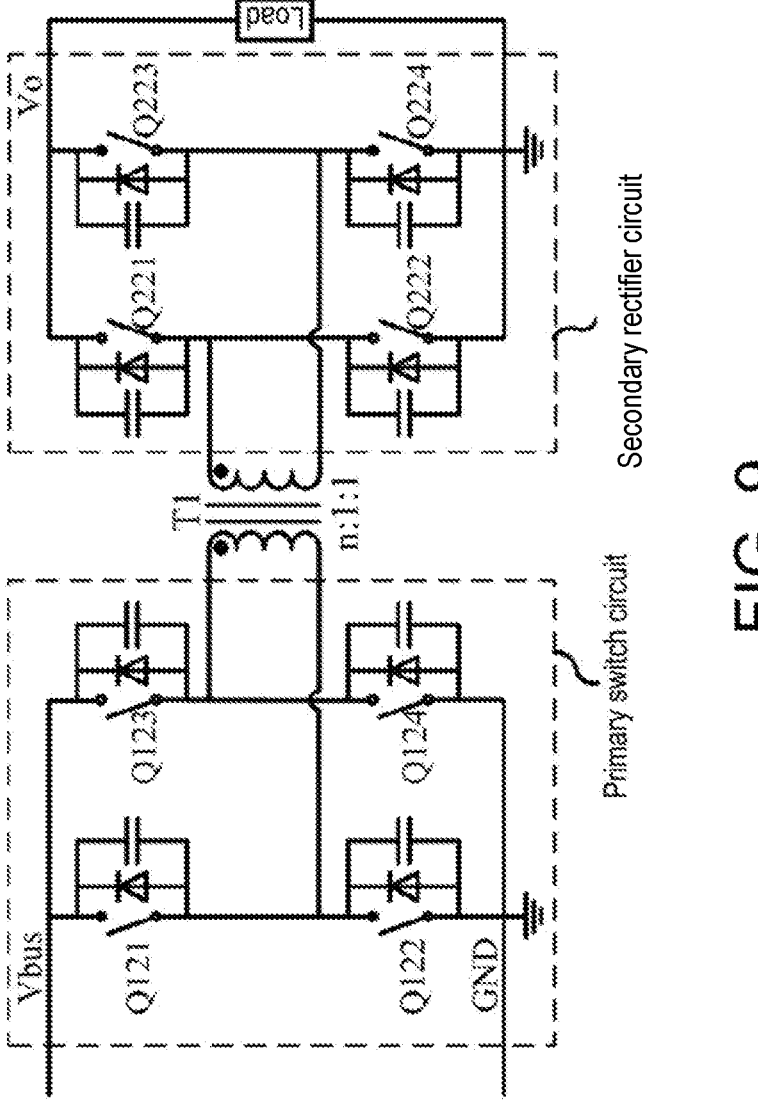
FIG. 9 is a schematic diagram showing the principle of the post-stage isolation switch power supply circuit according to a third embodiment of the disclosure.

Please refer to FIG. 9. FIG. 9 is schematic diagram showing the principle of the post-stage isolation switch power supply circuit according to the third embodiment of the disclosure, which includes a primary switch circuit, a transformer T1, and a secondary rectifier circuit. The primary switch circuit includes four switch transistors, and the four switch transistors and the transformer form a full-bridge circuit; the secondary rectifier circuit includes four switch transistors, and the four switch transistors and the transformer form a full-bridge rectifier circuit. The details are as follows.

The primary switch circuit includes a switch transistor Q121, a switch transistor Q122, a switch transistor Q123, and a switch transistor Q124.

The transformer T1 includes a primary winding and a secondary winding.

The secondary rectifier circuit includes a switch transistor Q221, a switch transistor Q222, a switch transistor Q223, and a switch transistor Q224.

One end of the switch transistor Q121 and one end of the switch transistor Q123 are connected to the bus Vbus, another end of the switch transistor Q121 and one end of the switch transistor Q122 are connected to the opposite end of the primary winding of the transformer T1, and another end of the switch transistor Q123 and one end of the switch transistor Q124 are connected to the same end of the primary winding of the transformer T1. Another end of the switch transistor Q122 and another end of the switch transistor Q124 are connected to the input power supply ground GND. Another end of the switch transistor Q221 and one end of the switch transistor Q222 are connected to the same end of the secondary winding of the transformer T1, and another end of the switch transistor Q223 and one end of the switch transistor Q224 are connected to the opposite end of the secondary winding of the transformer T1. Another end of the switch transistor Q222 and another end of the switch transistor Q224 are connected to the negative output of the cascade circuit. One end of the switch transistor Q221 and one end of the switch transistor Q223 are connected to the positive output Vo of the cascade circuit. The space between the positive output of the cascade circuit and the negative output of the cascade circuit is used to provide energy to the connected load.

The boost mode includes at least the excitation phase and the demagnetization phase. During the excitation phase, the switch transistor Q121, the switch transistor Q122, the switch transistor Q123, and the switch transistor Q124 are all on, and the switch transistor Q221, the switch transistor Q222, the switch transistor Q223, and the switch transistor Q224 are all off. The demagnetization phase is divided into two types, which work alternately, in which a first type is: the switch transistor Q121, the switch transistor Q124, the switch transistor Q222, and the switch transistor Q223 are all off, the switch transistor Q122, the switch transistor Q123, the switch transistor Q221, and the switch transistor Q224 are all on, and the transformer T1 transfers energy from the primary side to the secondary side; a second type is: the switch transistor Q121, the switch transistor Q124, the switch transistor Q222, and the switch transistor Q223 are all on, the switch transistor Q122, the switch transistor Q123, the switch transistor Q221, and the switch transistor Q224 are all off, and the transformer T1 transfers energy from the primary side to the secondary side.

The buck mode includes at least two alternating working states, in which a first type is: the switch transistor Q121, the switch transistor Q124, the switch transistor Q222, and the switch transistor Q223 are all off, the switch transistor Q122, the switch transistor Q123, the switch transistor Q221, and the switch transistor Q224 are all on; a second type is: the switch transistor Q121, the switch transistor Q124, the switch transistor Q222, and the switch transistor Q223 are all on, the switch transistor Q122, the switch transistor Q123, the switch transistor Q221, and the switch transistor Q224 are all off. In both working states, the transformer T1 can transfer energy from the primary side to the secondary side.

The Fourth Embodiment

Figure 10:
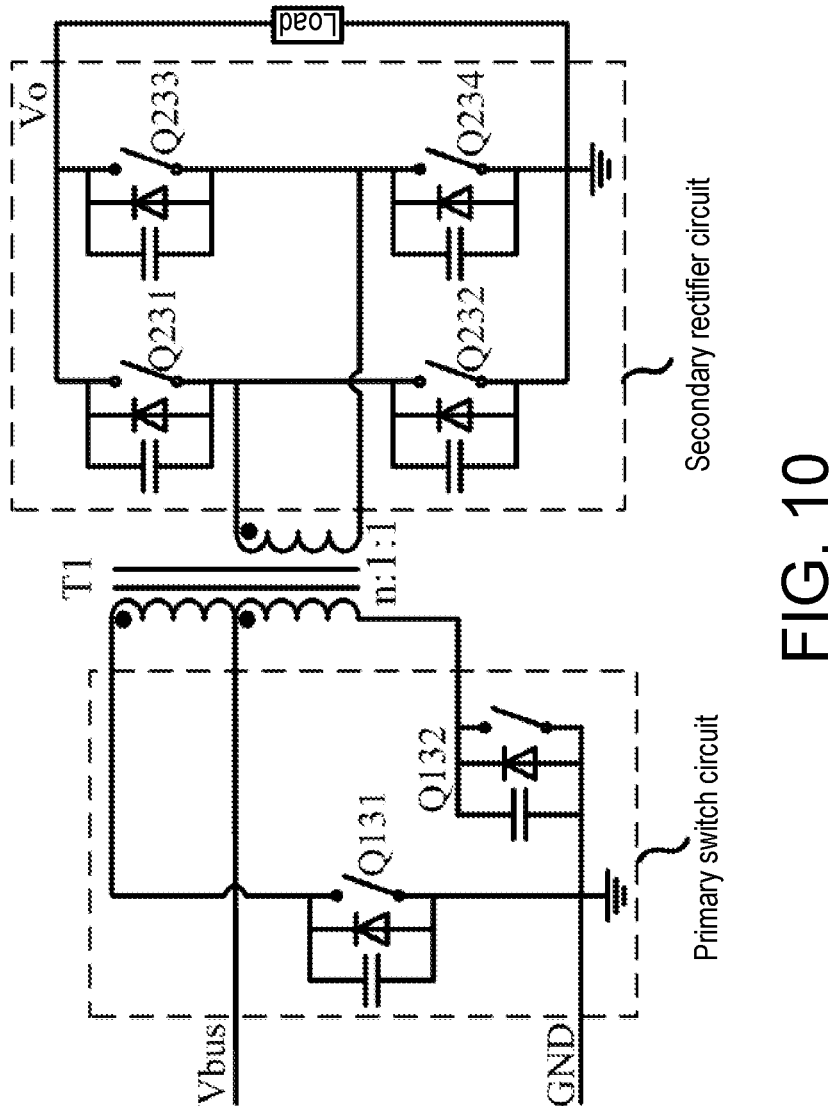
FIG. 10 is a schematic diagram showing the principle of the post-stage isolation switch power supply circuit according to a fourth embodiment of the disclosure.

Please refer to FIG. 10. FIG. 10 is a schematic diagram showing the principle of the post-stage isolation switch power supply circuit according to the fourth embodiment of the disclosure, which includes a primary switch circuit, a transformer T1, and a secondary rectifier circuit. The primary switch circuit includes two switch transistors, and the two switch transistors and the transformer form a push-pull circuit; the secondary rectifier circuit includes four switch transistors, and the four switch transistors and the transformer form a full-bridge rectifier circuit. The details are as follows:

The primary switch circuit includes a switch transistor Q131 and a switch transistor Q1323.

The transformer T1 includes a primary winding with a center tap and a secondary winding.

The secondary rectifier circuit includes a switch transistor Q231, a switch transistor Q232, a switch transistor Q233, and a switch transistor Q234.

One end of the switch transistor Q131 is connected to the same end of the primary winding of the transformer T1, and one end of the switch transistor Q132 is connected to the opposite end of the primary winding of the transformer T1. Another end of the switch transistor Q131 and another end of the switch transistor Q132 are connected to the input power supply ground GND. The center tap of the primary winding of the transformer T1 is connected to the bus Vbus. Another end of the switch transistor Q231 and one end of the switch transistor Q232 are connected to the same end of the secondary winding of the transformer T1, and another end of the switch transistor Q233 and one end of the switch transistor Q234 are connected to the opposite end of the secondary winding of the transformer T1. Another end of the switch transistor Q232 and another end of the switch transistor Q234 are connected to the negative output of the cascade circuit. One end of the switch transistor Q231 and one end of the switch transistor Q233 are connected to the positive output Vo of the cascade circuit. The space between the positive output of the cascade circuit and the negative output of the cascade circuit is used to provide energy to the connected load.

The boost mode includes at least an excitation phase and a demagnetization phase. During the excitation phase, the switch transistor Q131 and the switch transistor Q132 are both on, and the switch transistor Q231, the switch transistor Q232, the switch transistor Q233, and the switch transistor Q234 are all off. The demagnetization phase is divided into two types, which work alternately, in which a first type is: the switch transistor Q131, the switch transistor Q232, and the switch transistor Q233 are all off, the switch transistor Q132, the switch transistor Q231, and the switch transistor Q234 are all on, and the transformer T1 transfers energy from the primary side to the secondary side; a second type is: the switch transistor Q131, the switch transistor Q232, and the switch transistor Q233 are all on, the switch transistor Q132, the switch transistor Q231, and the switch transistor Q234 are all off, and the transformer T1 transfers energy from the primary side to the secondary side.

The buck mode includes at least two alternate working states, in which a first type is: the switch transistor Q131, the switch transistor Q232, and the switch transistor Q233 are all off, and the switch transistor Q132, the switch transistor Q231, and the switch transistor Q234 are all on; a second type is: the switch transistor Q131, the switch transistor Q232, and the switch transistor Q233 are all on, the switch transistor Q132, the switch transistor Q231, and the switch transistor Q234 are all off. In both working states, the transformer T1 can transfer energy from the primary side to the secondary side.

The above embodiments should not be regarded as limitations of the disclosure, and the protection scope of the disclosure should be subjected to the scope defined by the appended claims. For persons of ordinary skill in the art, several equivalent substitutions, improvements, and modifications may be made without departing from the spirit and scope of the disclosure, and the improvements and modifications should also be regarded as within the protection scope of the disclosure.

What is claimed is:

1. A cascade circuit, comprising a buck-boost circuit and an isolation switch power supply circuit, wherein:

the buck-boost circuit comprises a switch transistor (Q1), a switch transistor (Q2), a switch transistor (Q4), an inductor, an active clamping switch transistor (Q3), and an active clamping capacitor;

the isolation switch power supply circuit comprises a primary switch circuit, a transformer, and a secondary rectifier circuit;

one end of the switch transistor (Q1) serves as a positive input of the buck-boost circuit and a positive input of the cascade circuit at the same time; the other end of the switch transistor (Q1) is connected to one end of the switch transistor (Q2) and one end of the inductor; the other end of the inductor, one end of the switch transistor (Q4), and one end of the active clamping capacitor are connected together to serve as a positive output of the buck-boost circuit; the other end of the active clamping capacitor is connected to one end of the active clamping switch transistor (Q3); the other end of the switch transistor (Q2), the other end of the switch transistor (Q4), and the other end of the active clamping switch transistor (Q3) are connected together to serve as an input power supply ground of the buck-boost circuit and an input ground of the cascade circuit; and a positive input of the isolation switch power supply circuit is connected to the positive output of the buck-boost circuit; a negative input of the isolation switch power supply circuit is connected to the input power supply ground of the buck-boost circuit; a positive output of the isolation switch power supply circuit serves as a positive output of the cascade circuit; and a negative output of the isolation switch power supply circuit serves as a negative output of the cascade circuit, wherein the primary switch circuit comprises two switch transistors, and the two switch transistors and the transformer form a push-pull circuit; the secondary rectifier circuit comprises two switch transistors, and the two switch transistors and the transformer form a full-wave rectifier circuit.

2. The cascade circuit according to claim 1, wherein the switch transistor (Q1), the switch transistor (Q2), the switch transistor (Q4), and the active clamping switch transistor (Q3) are MOS transistors, triodes, or insulated-gate bipolar transistors (IGBTs).

3. A control method of the cascade circuit according to claim 1, comprising:

in response to a voltage of a positive input of the cascade circuit being less than a voltage of a positive output of the buck-boost circuit, operating the cascade circuit in a boost mode, wherein the boost mode comprises at least an excitation phase and a demagnetization phase;

wherein regardless of whether being the excitation phase or the demagnetization phase, remaining the switch transistor (Q1) on, and remaining the switch transistor (Q2) off;

during the excitation phase, turning the switch transistor (Q4) and the primary switch circuit both on, and turning the active clamping switch transistor (Q3) off; and during the demagnetization phase, turning the switch transistor (Q4) off, turning the active clamping switch transistor (Q3) on or on for part of time, and turning part of the switch transistors of the primary switch circuit on, thereby transferring energy from a primary side to a secondary side through a transformer.

4. A control method of the cascade circuit according to claim 1, comprising:

in response to a voltage of a positive input of the cascade circuit being greater than a voltage of a positive output of the buck-boost circuit, operating the cascade circuit in a buck mode, wherein the buck mode comprises at least an excitation phase and a demagnetization phase;

wherein regardless of whether being the excitation phase or the demagnetization phase, remaining the switch transistor (Q4) off, and turning the active clamping switch transistor (Q3) on or on for part of time;

during the excitation phase, turning the switch transistor (Q2) off, and turning the switch transistor (Q1) and part of the switch transistors of the primary switch circuit on, thereby transferring energy from a primary side to a secondary side through the transformer; and during the demagnetization phase, turning the switch transistor (Q1) off, and turning the switch transistor (Q2) and part of the switch transistors of the primary switch circuit on, thereby transferring the energy from the primary side to the secondary side through a transformer.

5. A cascade circuit, comprising a buck-boost circuit and an isolation switch power supply circuit, wherein:

the buck-boost circuit comprises a switch transistor (Q1), a switch transistor (Q2), a switch transistor (Q4), an inductor, an active clamping switch transistor (Q3), and an active clamping capacitor;

the isolation switch power supply circuit comprises a primary switch circuit, a transformer, and a secondary rectifier circuit;

one end of the switch transistor (Q1) serves as a positive input of the buck-boost circuit and a positive input of the cascade circuit at the same time; the other end of the switch transistor (Q1) is connected to one end of the switch transistor (Q2) and one end of the inductor; the other end of the inductor, one end of the switch transistor (Q4), and one end of the active clamping capacitor are connected together to serve as a positive output of the buck-boost circuit; the other end of the active clamping capacitor is connected to one end of the active clamping switch transistor (Q3); the other end of the switch transistor (Q2), the other end of the switch transistor (Q4), and the other end of the active clamping switch transistor (Q3) are connected together to serve as an input power supply ground of the buck-boost circuit and an input ground of the cascade circuit; and a positive input of the isolation switch power supply circuit is connected to the positive output of the buck-boost circuit; a negative input of the isolation switch power supply circuit is connected to the input power supply ground of the buck-boost circuit; a positive output of the isolation switch power supply circuit serves as a positive output of the cascade circuit; and a negative output of the isolation switch power supply circuit serves as a negative output of the cascade circuit, wherein the primary switch circuit comprises four switch transistors, and the four switch transistors and the transformer form a full-bridge circuit; the secondary rectifier circuit comprises two switch transistors, and the two switch transistors and the transformer form a full-wave rectifier circuit.

6. A cascade circuit, comprising a buck-boost circuit and an isolation switch power supply circuit, wherein:

the buck-boost circuit comprises a switch transistor (Q1), a switch transistor (Q2), a switch transistor (Q4), an inductor, an active clamping switch transistor (Q3), and an active clamping capacitor;

the isolation switch power supply circuit comprises a primary switch circuit, a transformer, and a secondary rectifier circuit;

one end of the switch transistor (Q1) serves as a positive input of the buck-boost circuit and a positive input of the cascade circuit at the same time; the other end of the switch transistor (Q1) is connected to one end of the switch transistor (Q2) and one end of the inductor; the other end of the inductor, one end of the switch transistor (Q4), and one end of the active clamping capacitor are connected together to serve as a positive output of the buck-boost circuit; the other end of the active clamping capacitor is connected to one end of the active clamping switch transistor (Q3); the other end of the switch transistor (Q2), the other end of the switch transistor (Q4), and the other end of the active clamping switch transistor (Q3) are connected together to serve as an input power supply ground of the buck-boost circuit and an input ground of the cascade circuit; and a positive input of the isolation switch power supply circuit is connected to the positive output of the buck-boost circuit; a negative input of the isolation switch power supply circuit is connected to the input power supply ground of the buck-boost circuit; a positive output of the isolation switch power supply circuit serves as a positive output of the cascade circuit; and a negative output of the isolation switch power supply circuit serves as a negative output of the cascade circuit, wherein the primary switch circuit comprises four switch transistors, and the four switch transistors and the transformer form a full-bridge circuit; the secondary rectifier circuit comprises four switch transistors, and the four switch transistors and the transformer form a full-bridge rectifier circuit.

7. A cascade circuit, comprising a buck-boost circuit and an isolation switch power supply circuit, wherein:

the buck-boost circuit comprises a switch transistor (Q1), a switch transistor (Q2), a switch transistor (Q4), an inductor, an active clamping switch transistor (Q3), and an active clamping capacitor;

the isolation switch power supply circuit comprises a primary switch circuit, a transformer, and a secondary rectifier circuit;

one end of the switch transistor (Q1) serves as a positive input of the buck-boost circuit and a positive input of the cascade circuit at the same time; the other end of the switch transistor (Q1) is connected to one end of the switch transistor (Q2) and one end of the inductor; the other end of the inductor, one end of the switch transistor (Q4), and one end of the active clamping capacitor are connected together to serve as a positive output of the buck-boost circuit; the other end of the active clamping capacitor is connected to one end of the active clamping switch transistor (Q3); the other end of the switch transistor (Q2), the other end of the switch transistor (Q4), and the other end of the active clamping switch transistor (Q3) are connected together to serve as an input power supply ground of the buck-boost circuit and an input ground of the cascade circuit; and a positive input of the isolation switch power supply circuit is connected to the positive output of the buck-boost circuit; a negative input of the isolation switch power supply circuit is connected to the input power supply ground of the buck-boost circuit; a positive output of the isolation switch power supply circuit serves as a positive output of the cascade circuit; and a negative output of the isolation switch power supply circuit serves as a negative output of the cascade circuit, wherein the primary switch circuit comprises two switch transistors, and the two switch transistors and the transformer form a push-pull circuit; the secondary rectifier circuit comprises four switch transistors, and the four switch transistors and the transformer form a full-bridge rectifier circuit.

* * * * *